US011678275B2

(12) United States Patent
Ramasamy et al.

(10) Patent No.: US 11,678,275 B2
(45) Date of Patent: Jun. 13, 2023

(54) INTEGRATED MULTIPLE RADIO ACCESS TECHNOLOGY ANTENNA CONTROL, CONFIGURATION, AND MANAGEMENT SYSTEM AND METHOD (71) Applicant: Dell Products L.P., Round Rock, TX (US)

(72) Inventors: Suresh Ramasamy, Cedar Park, TX (US); Lars Fredrik Proejts, Taipei (TW); Ching Wei Chang, Cedar Park, TX (US); Ravichandra Rama, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/384,713

(22) Filed: Jul. 24, 2021

(65) Prior Publication Data
US 2023/0021654 A1 Jan. 26, 2023

(51) Int. Cl.
*H04W 52/38* (2009.01)
*H04W 52/28* (2009.01)

(52) U.S. Cl.
CPC ......... *H04W 52/283* (2013.01); *H04W 52/38* (2013.01)

(58) Field of Classification Search
CPC ............................ H04W 52/283; H04W 52/38
USPC ......................................................... 455/522
See application file for complete search history.

(56) References Cited

U.S. PATENT DOCUMENTS

| 10,924,145 | B2* | 2/2021 | Mercer ..................... H01P 5/18 |
| 11,432,249 | B1* | 8/2022 | Sambhwani ......... H04B 17/102 |
| 2013/0237272 | A1* | 9/2013 | Prasad ................... H01Q 1/245 |
| | | | 342/372 |
| 2014/0128032 | A1* | 5/2014 | Muthukumar .... H04W 52/0254 |
| | | | 455/412.2 |
| 2016/0164563 | A1* | 6/2016 | Khawand ............ H04W 52/221 |
| | | | 455/127.2 |
| 2018/0175944 | A1* | 6/2018 | Seyed ................... H04B 17/102 |
| 2018/0287650 | A1* | 10/2018 | Mercer ................. H04W 52/18 |
| 2018/0367177 | A1* | 12/2018 | Ramasamy ............ H04B 1/126 |
| 2019/0215765 | A1* | 7/2019 | Ramasamy ......... H04W 52/243 |
| 2019/0253095 | A1* | 8/2019 | Mercer ................. H04W 52/18 |
| 2020/0015161 | A1* | 1/2020 | Ramasamy .......... H01Q 1/2291 |
| 2020/0412459 | A1* | 12/2020 | Seyed ................. H04W 52/283 |
| 2021/0051465 | A1* | 2/2021 | Koshy ................. H04W 52/367 |
| 2022/0094055 | A1* | 3/2022 | Ramasamy ............ H01Q 5/307 |

* cited by examiner

*Primary Examiner* — Hai V Nguyen
(74) *Attorney, Agent, or Firm* — Larson Newman, LLP (57) ABSTRACT An information handling system includes an antenna controller that may receive, from a platform sensor, platform sensor information as to a physical configuration usage mode, and receive, from a proximity sensor, information as to a part of a body of a user to an antenna. The antenna controller may also obtain a radio transmit power level value corresponding to the platform sensor information and to the proximity sensing information, send the radio transmit power level value to a radio via a serial interface, and reconfigure the antenna in response to the platform sensor information and the proximity sensing information. A radio may adjust a radio transmit power level to an adjusted radio transmit power level based on the radio transmit power level value.

20 Claims, 5 Drawing Sheets

INTEGRATED MULTIPLE RADIO ACCESS TECHNOLOGY ANTENNA CONTROL, CONFIGURATION, AND MANAGEMENT SYSTEM AND METHOD

FIELD OF THE DISCLOSURE

The present disclosure generally relates to information handling systems, and more particularly relates to integrated multiple radio access technology antenna control, configuration, and management.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes an antenna controller that may receive, from a platform sensor, platform sensor information as to a physical configuration usage mode, and receive, from a proximity sensor, information as to a part of a body of a user to an antenna. The antenna controller may also obtain a radio transmit power level value corresponding to the platform sensor information and to the proximity sensing information, send the radio transmit power level value to a radio via a serial interface, and reconfigure the antenna in response to the platform sensor information and the proximity sensing information. A radio may adjust a radio transmit power level to an adjusted radio transmit power level based on the radio transmit power level value.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
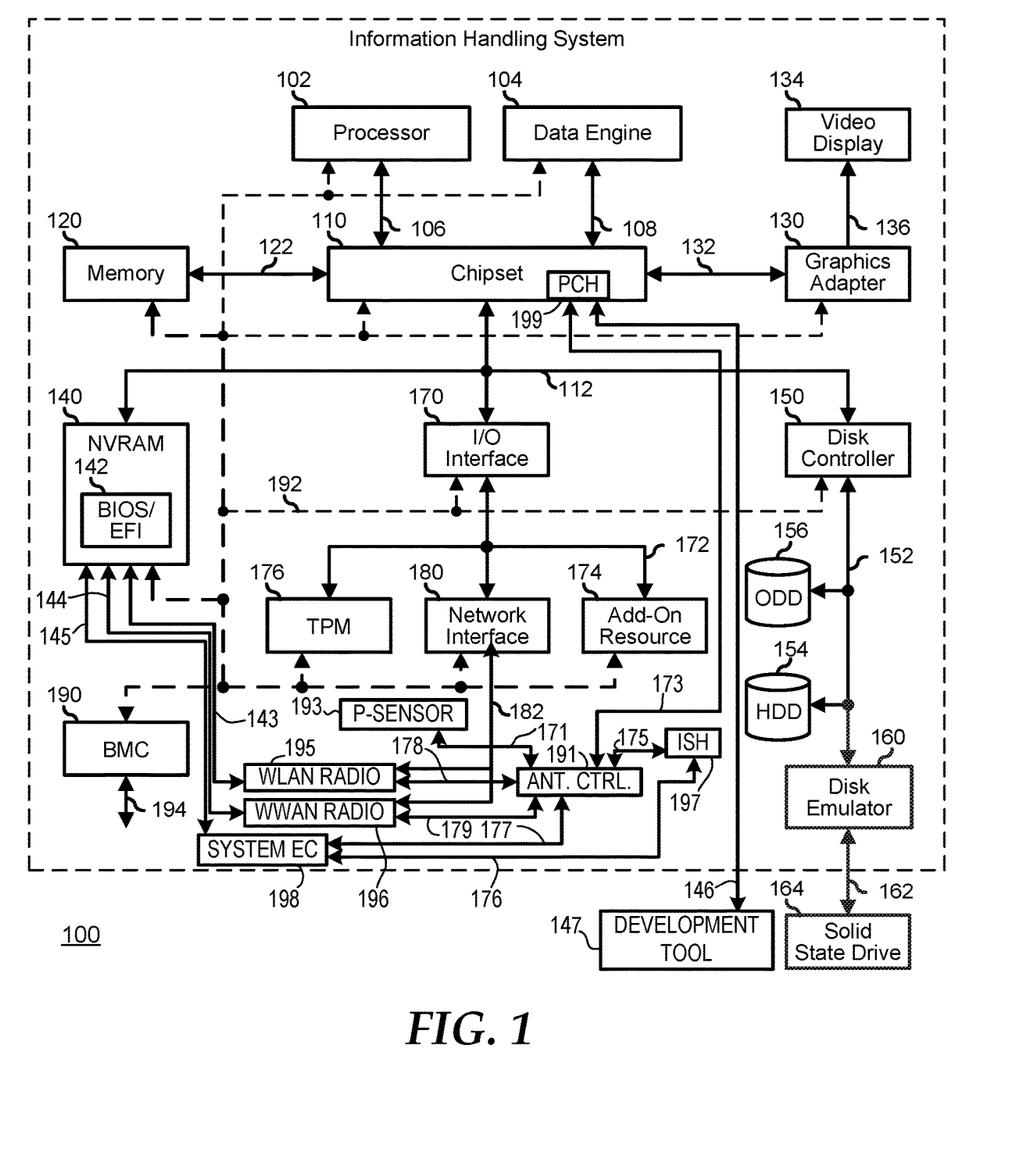
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics adapter 130, include a basic input and output system/extensible firmware interface (BIOS/EFI) module 140, a disk controller 150, a disk emulator 160, an input/output (I/O) interface 170, a network interface 180, baseboard management controller (BMC) 190, antenna controller (AC) 191, proximity sensor (P-sensor) 193, wireless local area network (WLAN) radio 195, wireless wide area network (WWAN) radio 196, integrated sensor hub (ISH) 197, and system embedded controller (EC) 198. Chipset 110 comprises platform controller hub (PCH) 199. Processor 102 is connected to chipset 110 via processor interface 106, and processor 104 is connected to chipset 110 via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a Serial Peripheral Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channel 182 that can provide an interface to devices that are internal or external to information handling system 100. In a particular embodiment, network channel 182 of a different type than peripheral channel 172 and network interface 180 translates information from a format suitable to the peripheral channel to a format suitable to external devices. An example of network channel 182 includes InfiniBand channels, Fibre Channel channels, Gigabit Ethernet channels, proprietary channel architectures, or a combination thereof. Network channel 182 can be connected to external network resources (not illustrated), either directly or via component such as WLAN radio 195, WWAN radio 196, or both. The network resource can include another information handling system, a data storage system, another network, a grid management system, another suitable resource, or a combination thereof.

BMC 190 is connected by a management interface 192 to a plurality of system components, such as processor 102, processor 104, memory 120, chipset 110, graphics adapter 130, I/O interface 170, disk controller 150, NVRAM module 140, TPM 176, network interface 180, and add-on resource 174. BMC 190 is connected to an external management interface 194 for platform management by an external IHS.

Network interface 180 is connected to WLAN radio 195 and WWAN radio 196 via network channel 182. WLAN radio 195 is connected to antenna controller (AC) 191 via interconnect 178. WWAN radio 196 is connected to AC 191 via interconnect 179. AC 191 is connected to proximity sensor (P-sensor) 193 via interconnect 171. AC 191 is connected to integrated system hub (ISH) 197 via interconnect 175. ISH 197 is connected to system embedded controller (EC) 198 via interconnect 176. AC 191 is connected to system EC 198 via interconnect 177. System EC 198 is connected to NVRAM 140 comprising BIOS/EFI 142 via interconnect 145. NVRAM 140 is connected to WLAN radio 195 via interconnect 143.

NVRAM 140 is connected to WWAN radio 195 via interconnect 144. AC 191 is connected to platform controller hub (PCH) 199 via interconnect 173. PCH 199 can be connected to a development tool 147 via interconnect 146. Elements within IHS 100 can be implemented as described using similar names with respect to elements shown on other drawings described below.

Figure 2:
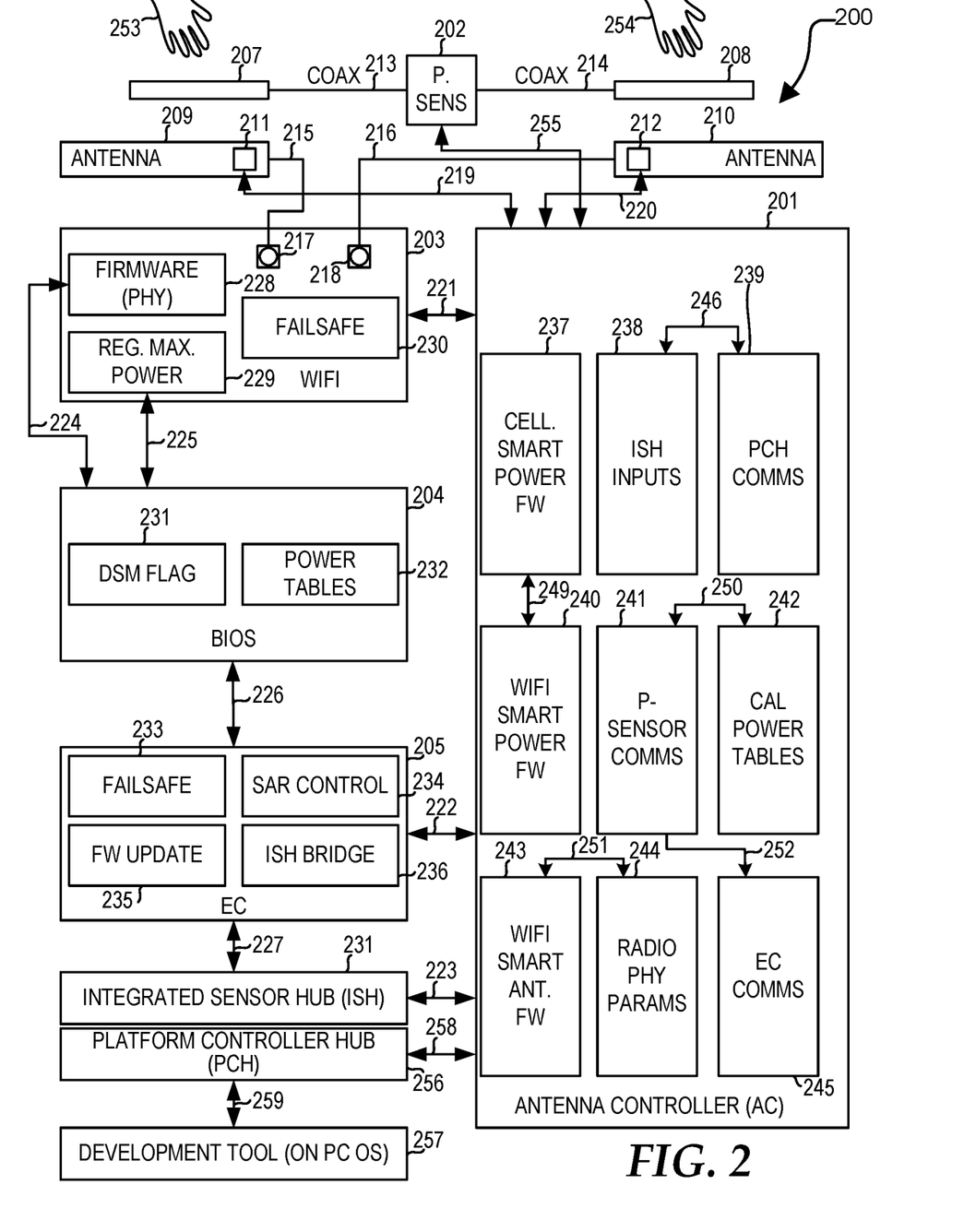
FIG. 2 is a block diagram illustrating an integrated multiple radio access technology antenna control, configuration, and management system according to an embodiment of the present disclosure.

FIG. 2 shows an integrated multiple radio access technology antenna control, configuration, and management system according to an embodiment of the present disclosure. System 200 includes AC 201, proximity sensor (P-sensor) 202, WLAN radio (for example WiFi radio, where WiFi refers to the Institute of Electrical and Electronics Engineers 802.11 wireless local area network standard) 203, basic input/output system (BIOS) 204, system EC 205, integrated sensor hub (ISH) 231, platform controller hub (PCH) 256, development tool 257, proximity sensing conductor 207, proximity sensing conductor 208, antenna 209, and antenna 210. In the case of active antennas, antenna 209 can include antenna tuning circuit 211, and antenna 210 can include antenna tuning circuit 212.

AC 201 includes cellular smart power firmware block 237, ISH inputs block 238, platform controller hub (PCH) communications block 239, WLAN radio smart power firmware block 240, P-sensor communications block 241, calibration power tables block 242, WLAN radio smart antenna firmware block 243, radio physical interface (PHY) parameters block 244, and EC communications block 245. WLAN radio 203 includes firmware block 228 for the radio physical interface (PHY), regulatory maximum power value storage block 229, failsafe block 230, antenna connector 217, and antenna connector 218. BIOS 204 includes device-specific method (DSM) flag block 231 and power tables block 232. System EC 205 includes failsafe block 233, specific-absorption-rate (SAR) control block 234, firmware update block 235, and ISH bridge block 236. As an example, SAR control block 234 can be implemented as a finite state machine (FSM) for handling P-sensor-related events. As an example, SAR control block 234 can be implemented to track switching of states of operation in response to triggering of P-sensor 202 and ending of the triggering. When proximity of a portion of a body of a user, such as hand 253, is sensed near proximity sensing conductor 207, located near antenna 209, P-sensor 202, which is electrically connected to proximity sensing conductor 207 via interconnect 213, can provide proximity sensing information to AC 201 via interconnect 255. AC 201 can provide an output, such as the proximity sensing information or radio transmit power level control information to EC 205 via interconnect 222. SAR control block 234 can track a state for operation of radio 203 based, at least in part, on the triggering of P-sensor 202 or the ending of the triggering. As an example, even in the event of a failure involving AC 201, EC 205 can use the state information of SAR control block 234 to communicate control information to BIOS 204 via interconnect 226, and BIOS 204 can provide to radio 203 via interconnect 225 a radio transmit power level value from power tables block 232 to control a radio transmit power level of radio 203, assuring continued radio operation in regulatory compliance (e.g., a SAR limit) even during a failure event. As one example, BIOS 204 can provide a particular radio transmit power level value from power tables block 232 to radio 203. As another example, BIOS 204 can provide a power table of a plurality of radio transmit power level values from power tables block 232 to radio 203. In accordance with at least one embodiment, failsafe block 233 of EC 205, failsafe block 230 of radio 203, or both, can provide a failure notification, for example, upon cessation of reception of a heartbeat message between AC 201 and EC 205 or between AC 201 and radio 203, respectively. The failure notification can be communicated among elements that have not failed, for example, among radio 203, BIOS 204, and EC 205. Thus, for example, while SAR control block 234 can maintain state information based on an output of AC 201 that can be based on proximity sensing information obtained from P-sensor 202, EC 205 can disregard the state information of SAR control block 234 as possibly stale and inaccurate when a failure of AC 201 is suspected and can instead utilize failsafe features, such as a failsafe block, to control a radio transmit power level of radio 203 during a failure event.

AC 201 is connected to P-sensor 202 via interconnect 255. P-sensor 202 is connected to proximity sensing conductor 207 via interconnect 213, which may, for example, be a coaxial cable or a stripline, such as a microstrip, transmission line. P-sensor 202 is connected to proximity sensing conductor 208 via interconnect 214, which may, for example, be a coaxial cable or a stripline, such as a microstrip, transmission line. AC 201 is connected to antenna tuning circuit 211 via interconnect 219. AC 201 is connected to antenna tuning circuit 212 via interconnect 220. Antenna connector 217 is connected to antenna 209 via interconnect 215, which may, for example, be a coaxial cable or a stripline, such as a microstrip, transmission line. Antenna connector 218 is connected to antenna 210 via interconnect 216, which may, for example, be a coaxial cable or a stripline, such as a microstrip, transmission line. Proximity sensing conductor 207 is located proximate to antenna 209 and is sensitive to the presence of a user (for example, a portion of a body of the user), such as hand 253, proximate to proximity sensing conductor 207, and thus proximate to antenna 209. Proximity sensing conductor 208 is located proximate to antenna 210 and is sensitive to the presence of a user (for example, a portion of a body of the user), such as hand 254, proximate to proximity sensing conductor 208, and thus proximate to antenna 210.

WLAN radio 203, for example, firmware block 228 for the radio physical interface, is connected to BIOS 204 via interconnect 224. WLAN radio 203, for example, regulatory maximum power value storage block 229, is connected to BIOS 204 via interconnect 225. BIOS 204 is connected to system EC 205 via interconnect 226. System EC 205 is connected to ISH 206 via interconnect 227. AC 201 is connected to WLAN radio 203 via interconnect 221. AC 201 is connected to system EC 205 via interconnect 222. AC 201 is connected to ISH 231 via interconnect 223. AC 201 is connected to PCH 258 via interconnect 258. PCH is connected to development tool 257 via interconnect 259. Development tool 257 may, for example, be executed on a personal computer (PC) operating system (OS).

Cellular smart power firmware block 237 is connected to WiFi smart power firmware block 240 via interconnect 249. ISH inputs block 238 is connected to PCH communications block 239 via interconnect 246. P-sensor communications block 241 is connected to calibration power tables block 242 via interconnect 250. WiFi smart antenna firmware block 243 is connected to radio PHY parameters block 244 via interconnect 251. P-sensor communications block 241 is connected to EC communications block 245 via interconnect 252.

Figure 3:
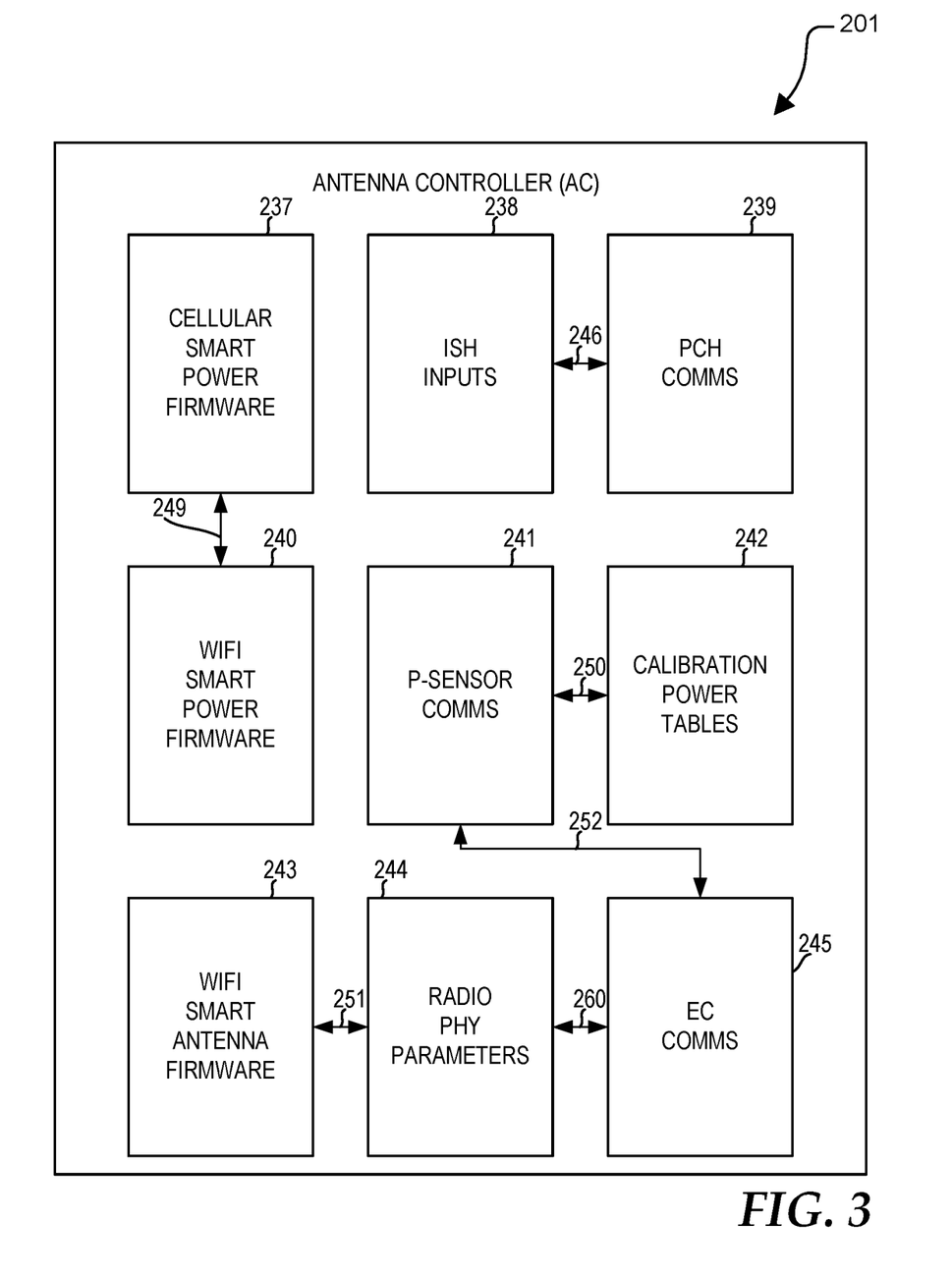
FIG. 3 is a block diagram illustrating an antenna controller (AC) of an integrated multiple radio access technology antenna control, configuration, and management system and method according to an embodiment of the present disclosure.

FIG. 3 shows an antenna controller (AC) of an integrated multiple radio access technology antenna control, configuration, and management system and method according to an embodiment of the present disclosure. AC 201 includes cellular smart power firmware block 237, ISH inputs block 238, platform controller hub (PCH) communications block 239, WLAN radio smart power firmware block 240, P-sensor communications block 241, calibration power tables block 242, WLAN radio smart antenna firmware block 243, radio physical interface (PHY) parameters block 244, and EC communications block 245.

Cellular smart power firmware block 237 is connected to WiFi smart power firmware block 240 via interconnect 249. ISH inputs block 238 is connected to PCH communications block 239 via interconnect 246. P-sensor communications block 241 is connected to calibration power tables block 242 via interconnect 250. WiFi smart antenna firmware block 243 is connected to radio PHY parameters block 244 via interconnect 251. P-sensor communications block 241 is connected to EC communications block 245 via interconnect 252.

Figure 4:
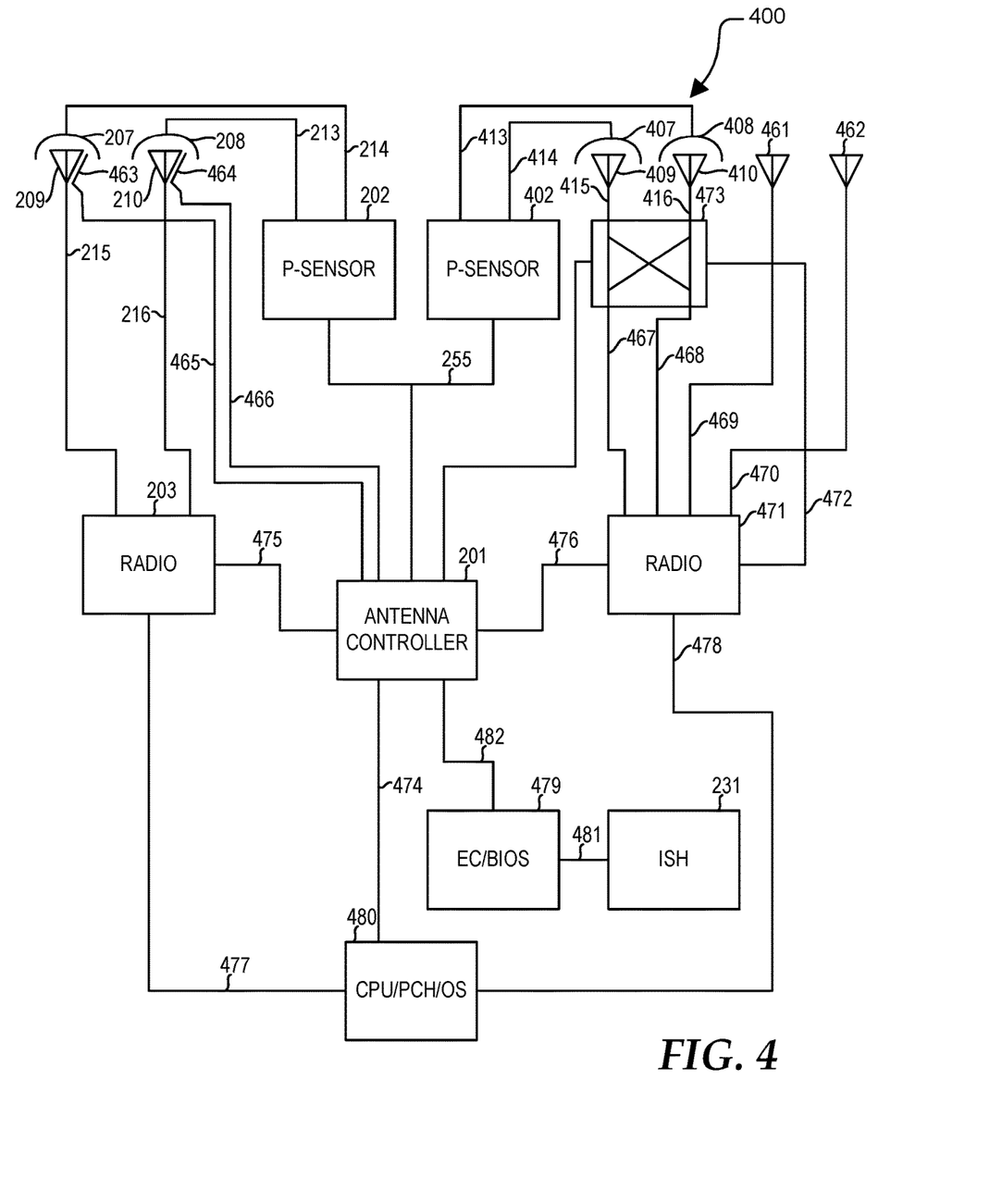
FIG. 4 is a block diagram illustrating an integrated multiple radio access technology antenna control, configuration, and management system according to an embodiment of the present disclosure.

FIG. 4 shows an integrated multiple radio access technology antenna control, configuration, and management system according to an embodiment of the present disclosure. System 400 includes AC 201, proximity sensor (P-sensor) 202, P-sensor 402, radio 203, radio 471, system EC and BIOS 479, integrated sensor hub (ISH) 231, system central processing unit (CPU), platform controller hub (PCH), and operating system (OS) 480, proximity sensing conductor 207, proximity sensing conductor 208, proximity sensing conductor 407, proximity sensing conductor 408, antenna 209, antenna 210, antenna 409, antenna 410, antenna 461, antenna 462, antenna steering element 463, antenna steering element 464, and antenna switch 473.

AC 201 is connected to P-sensor 202 and P-sensor 402 via interconnect 255. P-sensor 202 is connected to proximity sensing conductor 207 via interconnect 213. P-sensor 202 is connected to proximity sensing conductor 208 via interconnect 214. P-sensor 402 is connected to proximity sensing conductor 407 via interconnect 413. P-sensor 402 is connected to proximity sensing conductor 408 via interconnect 414. Radio 203 is connected to antenna 209 via interconnect 215. Radio 203 is connected to antenna 210 via interconnect 216. AC 201 is connected to radio 203 via interconnect 475. AC 201 is connected to radio 471 via interconnect 476. AC 201 is connected to CPU/PCH/OS 480 via interconnect 474. AC 201 is connected to EC/BIOS 479 via interconnect 482. AC 201 is connected to antenna switch 473 via interconnect 483. AC 201 is connected to antenna steering element 463 via interconnect 465.

AC 201 is connected to antenna steering element 464 via interconnect 466. Radio 203 is connected to CPU/PCH/OS 480 via interconnect 477. Radio 471 is connected to CPU/PCH/OS 480 via interconnect 478. EC/BIOS 479 is connected to ISH 231 via interconnect 481. Radio 471 is connected to a first port of antenna switch 473 via interconnect 467. Radio 471 is connected to a second port of antenna switch 473 via interconnect 468. Antenna 409 is connected to a third port of antenna switch 473 via interconnect 415. Antenna 410 is connected to a fourth port of antenna switch 473 via interconnect 416. Antenna switch 473 is configurable to switch interconnect 467 to either of interconnects 415 and 416 and to switch interconnect 468 to the opposite interconnect of interconnects 415 and 416. Radio 471 is connected to antenna 461 via interconnect 469. Radio 471 is connected to antenna 462 via interconnect 470. Radio 471 is connected to antenna switch 473 via interconnect 472.

AC 201, being connected to other system components, having access to sensor and state information, and being able to exert control over the other system components, can serve as the key component of an integrated multiple-radio-access-technology (multi-RAT) antenna control, configuration, and management system for an IHS. For example, information sensed by sensors connected to ISH 231 can be provided to AC 201, for example, via EC/BIOS 479. Information pertinent to central processing functions of the IHS, such as information pertaining to the execution of software applications on the IHS and the communication functionality to be provided to them can be obtained by AC 201 from CPU/PCH/OS 480. Proximity sensing information can be obtained by AC 201 from P-sensor 202 and P-sensor 402. An awareness of radio operational parameters and state information can be obtained by AC 201 from radio 203 and radio 471.

AC 201 can analyze the information obtained to provide control over radios 203 and 471 and other components of the wireless subsystem. As an example, AC 201 can control a radio transmit power level of each of radio 203 and radio 471. As a more specific example, AC 201 can control a radio maximum transmit power level of each of radio 203 and radio 471, wherein the radio maximum transmit power level is a maximum power level at which radio 203 or radio 471 is allowed to transmit. As an example, different maximum power settings can be triggered based on device usage. For example, a notebook-mode radio maximum transmit power level can be triggered to be used when an IHS is in a notebook mode as its IHS physical configuration usage mode, and a tablet-mode radio maximum transmit power level can be triggered to be used when the IHS is in a tablet mode as its IHS physical configuration usage mode. The IHS physical configuration usage mode can be sensed, for example, by a sensor that provides its sensing information to AC 201, for example, via ISH 231. One example of such a sensor is a hinge sensor, which can sense an orientation of a hinge between a keyboard portion of an IHS housing and a display portion of the IHS housing. Sensing information from sensors can be evaluated by AC 201 in the context of stock-keeping unit (SKU) information denoting physically installed IHS component options. AC 201 can control a radio maximum power level of each of radio 203 and 471 by, as one example, sending a message to radio 203 or radio 471 specifying a radio maximum transmit power level value. The message can transmit a single radio maximum transmit power level value, a power table of a plurality of radio maximum transmit power level values comprising an appropriate radio maximum transmit power level value, e.g., for a given IHS physical configuration usage mode, or an indication to for radio 203 or radio 471 to select an appropriate radio maximum transmit power level value from a power table already existent in radio 203 or radio 471. As an example, radio 203 or radio 471 can transmit at a radio transmit power level corresponding to a radio maximum transmit power level value. As another example, radio 203 or radio 471 can transmit at a radio transmit power level lower than the radio maximum transmit power level value, with power reduction from a radio maximum transmit power level corresponding to the radio maximum transmit power level value to the actual radio transmit power level being based on other information available, such as sensing information from other sensors, which may be P-sensor 202 or other sensors, such as a click pad sensor, or metrics of a wireless signal, such as received signal strength indication (RSSI), signal-to-noise (SN) ratio, bit-error rate (BER), etc., of a wireless signal received by radio 203 or radio 471. As another example, AC 201 can control antenna steering of antennas, such as antennas 209 and 210, using antenna steering elements, such as antenna steering elements 463 and 464. As yet another example, AC 201 can control switching of antennas using antenna switch 473. The connectivity of AC 201 to P-sensor 202 and P-sensor 402 as well as the control by AC 201 of antenna switch 473 allows AC 201 to correctly map P-sensor channels the antenna connections of radio 471 even if the setting of antenna switch 473 by AC 201 changes which of antennas 409 and 410 is connected to which of interconnects 467 and 468 via interconnects 415 and 416 and antenna switch 473. Thus, AC 201 can continue to control radio 471 to provide an optimal radio transmit power level for each of antennas 409 and 410, responsive to proximity of a part of a body of a user, maintaining specific-absorption-rate (SAR) regulatory compliance even as the connections of antennas 409 and 410 are switched by AC 201 using antenna switch 473.

In accordance with at least one embodiment, AC 201 can coordinate its control of antenna steering with its control of radio 203. As an example, AC 201 can control a radio transmit power levels of radio 203 that accounts for steering of radiation patterns of antennas 209 and 210, which AC 201 can control. AC 201 can further adapt its control of the radio transmit power levels of radio 203 to account for proximity sensing. As an example, a plurality of segments of each of proximity sensing conductors 207 and 208 can be provided via respective per-segment interconnects to P-sensor 202, allowing P-sensor to sense proximity of a part of a body of a user in relation to an orientation of a gain lobe of a radiation pattern provided by one or both of antennas 209 and 210, acting individually or as a combined array with one another, responsive to one or both of antenna steering elements 463 and 464.

AC 201 can calculate one or more radio transmit power level values in real time, can calculate a radio transmit power table to communicate to radio 203, or can load an appropriate pre-determined radio transmit power table and either communicate the appropriate pre-determined radio transmit power table to radio 203 or select a radio transmit power level value from the table to specify to radio 203 for selection of a radio transmit power level to be used by radio 203. While FIG. 4 shows switchable and steerable antennas to be different antennas, an antenna switch similar to antenna switch 473 can be used with interconnects 215 and 216 to provide switchable and steerable antennas, which can have the proximity sensing of proximity sensing conductors 207 and 208 (and optionally additional proximity sensing conductors for finer-granularity segmentation of proximity sensing), for which AC 201 can provide integrated control of proximity sensing, antenna switching, antenna steering, IHS installed hardware component detection (for example, SKU detection), physical configuration usage mode (for example notebook mode vs. tablet mode) detection, and radio transmit power level control responsive to detected conditions and controlled values and states to assure regulatory compliance (for example SAR compliance) across a broad range of product hardware configurations, physical configuration usage modes, user locations with respect to the IHS, radio-frequency (RF) environmental conditions.

Figure 5:
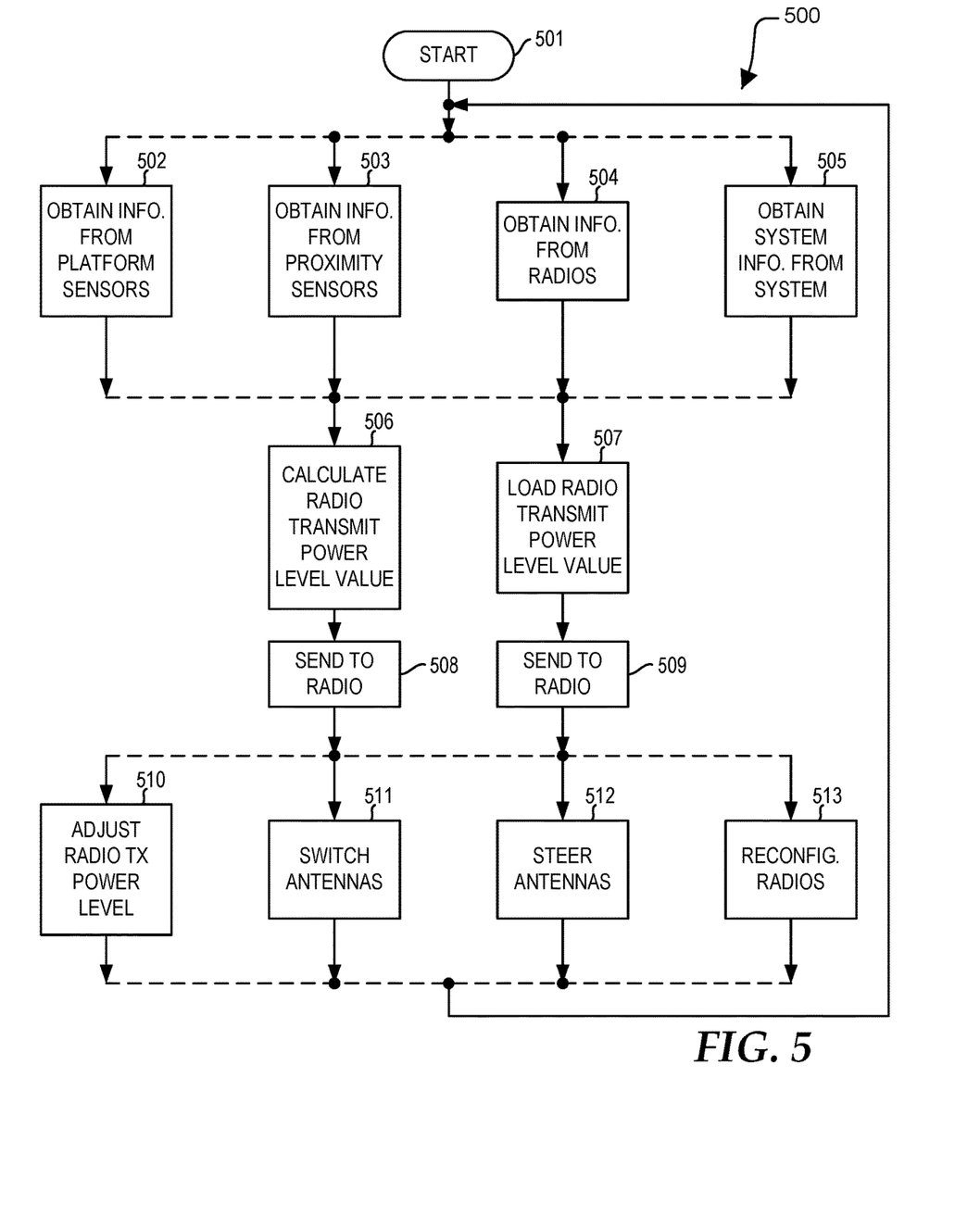
FIG. 5 is a flow diagram illustrating a method for integrated multiple radio access technology antenna control, configuration, and management according to an embodiment of the present disclosure.

FIG. 5 shows a method for integrated multiple radio access technology antenna control, configuration, and management according to an embodiment of the present disclosure. Method 500 begins at block 501 and continues to one or more of blocks 502, 503, 504, and 505. At block 502, AC 201 of FIGS. 2, 3, and 4, which may, for example, implement AC 191 of FIG. 1, obtains information from platform sensors. Platform sensors include of sensors that detect an orientation of an element of an IHS relative to another element of the IHS or to its environment, such as to a gravity vector, and sensors that detect the presence of a part of a body of a user to a non-antenna element of the IHS. Such information from platform sensors can be obtained, for example, via ISH 231. As an example, a hinge sensor may provide information regarding a hinge position of a hinge of the IHS 100.

The hinge position may be indicative of a physical configuration usage mode (for example a notebook mode or a tablet mode) of the IHS. As another example, a click pad sensor may provide information in relation to a click pad of an IHS. For example, the click pad may provide proximity sensing of a user's finger to the click pad, which can be used to inform AC 201 of a physical configuration usage mode of the IHS. As another example, a lid closure sensor can detect whether a lid of a notebook computer is open or closed, which may be indicative of a physical configuration usage mode of the IHS. Information from one or more of the platform sensors can inform the AC as to aspects of the physical configuration usage mode, which the AC can use to calculate or retrieve radio transmit power level values or power tables, as will be discussed below with respect to blocks 506, 507, 508, and 509, and to control aspects of the wireless subsystem, as will be discussed below with respect to blocks 510, 511, 512, and 513.

At block 503, AC 201 obtains proximity sensing information from P-sensors, such as P-sensors 202 and 402. Proximity sensing information can inform AC 201 of the presence of a part of a human body, such as the IHS user's body, in proximity to one or more antennas of the wireless subsystem. AC 201 can use such proximity sensing information to calculate or retrieve radio transmit power level values or power tables and to control aspects of the wireless subsystem.

At block 504, AC 201 obtains information from radios. For example, AC 201 can read configuration values and operational states from radios 203 and 471. As another example, AC 201 can perform IHS installed hardware component detection by reading an installed hardware component identifier (for example a SKU) or identification of RF band capabilities and RF protocol capabilities from each of radios 203 and 471. Such information can inform AC 201 of aspects of radios 203 and 471 relevant to AC 201 performing optimized control of such radios.

At block 505, AC 201 obtains system information from the IHS, for example, from EC/BIOS 479 or from CPU/PCH/OS 480. For example, AC 201 can read configuration values and operational states from EC/BIOS 479 or from CPU/PCH/OS 480. As another example, AC 201 can perform IHS installed hardware component detection by reading installed hardware component identifiers and related configuration information from EC/BIOS 479 or from CPU/PCH/OS 480. Such information can inform AC 201 of aspects of desired use of the wireless subsystem of the IHS, and AC 201 can perform control within the wireless subsystem to configure it for desired use.

From any of blocks 502, 503, 504, and 505, method 500 continues to block 506 or block 507. Blocks 506 and 507 can be generalized as AC 201 obtaining a radio transmit power level value based on information received from any or all of blocks 502, 503, 504, and 505. At block 506, AC 201 calculates a radio transmit power level value based on information received at any or all of blocks 502, 503, 504, and 505. The calculation may be of a single value for real-time use or of a power table of values for use under a set of conditions that radios, such as radios 203 and 471, can determine to exist. From block 506, method 500 continues to block 508. At block 508, AC 201 sends the calculated radio transmit power level value to the radio to which it applies. AC 201 may send a single value or a power table of a plurality of values.

Blocks 506 and 508 may be performed for any number of radios to provide an appropriate calculated radio transmit power level value to each radio. At block 507, AC 201 loads a radio transmit power level value based on information receive at any or all of blocks 502, 503, 504, and 505. A single value may be loaded, or a power table of values may be loaded. The loading may, for example, be a loading of a single value or a power table of a plurality of values from a storage device, which may, as examples, be located within AC 201 or external to AC 201. As an example, AC 201 may load a stored power table of values from a BIOS or other storage device and may either use the stored power table as is or provide supplementation by adding an additional power table or modifying values in the existing stored power table. At block 509, AC 201 sends the loaded radio transmit power level value to the radio to which it applies. AC 201 may send a single value or a power table of a plurality of values. Blocks 507 and 509 may be performed for any number of radios to provide an appropriate loaded radio transmit power level value to each radio. The sending of blocks 508 and 509 the radio can be performed over a serial interface, such as via a serial communication line using a universal asynchronous receiver/transmitter (UART).

From either of blocks 508 or 509, method 500 continues to one or more of blocks 510, 511, 512, and 513. At block 510, the radio transmit power level is adjusted. In accordance with at least one embodiment, a radio, such as radio 203 or 471, can adjust its own power level based on a power table sent to it at either block 508 or 509 by AC 201. In accordance with at least one embodiment, AC 201 directly controls a radio to adjust the radio transmit power level. In the event of a loss of communication between AC 201 and the radio, the radio can be adjusted to operate at a failsafe radio transmit power level, which can assure regulatory (for example SAR) compliance. The loss of communication can be detected, for example, by cessation of detection of a heartbeat (HB) message communicated between the radio and another component, such as AC 201, in one direction, the opposite direction, or both directions.

The radio can be configured to reconfigure itself, or an alternative communication channel that hasn't failed can be used by another component, such as AC 201 or EC/BIOS 479, to reconfigure the radio. Blocks 511 and 512 can be generalized as AC 201 reconfiguring an antenna in response to the platform sensor information and the proximity sensing information. At block 511, AC 201 controls antenna switch 473 to switch antennas. As an example, antennas 409 and 410 can be switched using antenna switch 473. At block 512, AC 201 controls the steering of antennas, such as antennas 209 and 210, for example, using antenna steering elements 463 and 464. The steering can adjust a radiation pattern of an antenna, such as amounts of antenna gain in various directions. At block 513, AC 201 performs reconfiguration of radios, such as radio 203 and 471.

For example, an RF band, RF protocol, and other radio parameters can be changed based on the information obtained at blocks 502, 503, 504, and 505. As an example, in a system with multiple radios capable of WLAN use, WLAN functionality can be switched from a first WLAN-capable radio having a first antenna for which proximity sensing has been triggered to a second WLAN-capable radio having a second antenna spatially distant from the first antenna. As another example, in a system with multiple radios capable of WWAN use, WWAN functionality can be switched from a first WWAN-capable radio having a first antenna to a second WWAN-capable radio having a second antenna spatially distant from the first antenna.

In accordance with at least one embodiment, an integrated multiple-radio-access-technology (multi-RAT) antenna control, configuration, and management system is provided.

Existing lack of unified wireless subsystem management across multiple radios and multiple radio access technologies (for example wireless local area network (WLAN), fourth-generation (4G) long-term evolution (LTE) wireless wide area network (WWAN), fifth-generation (5G) LTE WWAN, other WWAN technology, etc.) limits scaling of antenna features while yielding sub-optimized system performance, as the control points do not communicate to each other, coordinate, and co-optimize the radio subsystem front end in terms of true dynamic power, reuse of proximity information from one radio sub-system to another, dynamic antenna sharing, etc.

As wireless communications capabilities of IHSs have been incrementally added over time, unified management of radio subsystems comprising, for example, antennas, front-end devices, and radio control arrangements in an IHS has been lacking. Such radio subsystems have generally not been integrated, in the sense that each radio has typically been individually and modularly connected from a host processor all the way to an antenna. Front-end devices, such as sensors and switches have been connected to a platform embedded controller (EC), with antenna features partly controlled by the platform EC, BIOS, or drivers. Such fragmentation limits scaling of antenna features while yielding sub-optimized system performance, as the control points typically do not communicate to each other, do not coordinate and co-optimize the front end in terms of true dynamic power, do not reuse proximity information from one radio sub-system to another, do not provide dynamic antenna sharing, and so on.

In accordance with at least one embodiment, a control, configuration, and management system capable of unifying a plurality of antennas, a plurality of radios, which may be of a plurality of radio access technologies, a one or more sensors, such as proximity sensors, each providing one or more proximity sensor channels, and one or more IHS physical configuration usage sensors into a coordinated, integrated system is provided. Components of the system can be specified by a stock keeping unit (SKU), which can denote a particular part or combination of parts installed in the IHS.

In accordance with at least one embodiment, an integrated antenna control system, using an antenna controller that communicates with various system elements such as a WLAN and a WWAN radio via a serial interface, a platform EC, on-board antenna sensors, a platform integrated sensor hub (ISH), and antenna front end such as may include switches, tuners, etc., a host platform controller hub (PCH) and is capable of dynamically reconfiguring, coordinating, and managing the control subsystem to co-optimize the antenna, the sensors, and the radios, resulting in enhanced wireless performance tailored to a platform SKU (for example 180-degree usage capable (for example a desktop IHS) or 360-degree usage capable (for example a 2-in-1 IHS that can be used in a notebook mode or a tablet mode), an antenna (for example active or passive), a radio (for example 4G, 5G, WLAN, etc.), a usage mode (for example open, closed, 360, etc.), transmission modes (for example 4G, 5G, WLAN, and co-existence modes such as 4G+WLAN, 5G+WLAN, etc.) at a finely granular level is provided. With the host interface support, the integrated antenna control system enables telemetry and diagnostics capabilities of the control system supporting factory and development tools.

In accordance with at least one embodiment, a wireless control subsystem integrates multiple radios, antennas, and sensors, a system EC, and a BIOS capable of configuring and managing wireless features across platform SKUs, delivering enhanced wireless performance for each SKU. In accordance with at least one embodiment, an overarching architecture that puts the smart antenna controller at the heart of the wireless subsystem enables adaptive wireless features, intelligent failsafe operation, which can be hardware-based, firmware-based, or both, P-sensor management across a plurality of possible SKUs (for example 4G/5G/

WLAN SKUs supporting 180/2-in-1 platform SKUs), a P-sensor function for WLAN antennas, serial messaging to radios (for, for example WLAN messaging, WWAN notification), an interface to a host OS for factory diagnostics and tools development, bi-directional communication to system EC for configuring the controller to operate in development or production mode, and management of active steerable and passive antennas under a single BIOS. Embodiments may be practiced with subsets of the foregoing.

In accordance with at least one embodiment, features provided by the integrated multiple-radio-access-technology (multi-RAT) antenna control, configuration, and management system can include serial messaging over a dedicated serial communications link between the AC and the WLAN radio; control of WLAN antennas adaptively based on parameter values of parameters such a proximity sensing, IHS physical configuration (for example wireless subsystem SKU), and physical configuration usage mode (for example notebook mode, tablet mode, etc.); WLAN adaptive antenna steering; WWAN/WLAN P-sensor management, WWAN/WLAN adaptive power control; communications between the AC and the EC; device user mode antenna tuning/power optimization; a host interface through which telemetry data may be communicated, for example, in a factory, for development work, or when an IHS is in service with an end user; a failsafe mechanism to assure proper operation upon component malfunction within the wireless subsystem; cellular radio tuning optimization and power control for proximity sensing and a physical configuration usage mode.

In accordance with at least one embodiment, a WLAN SAR radio transmit power level control feature is provided. The use of ACPI or SMBIOS hardcoded static SAR power back-offs would limit the ways to trigger selection of a power to use in a particular use case. In such a case, information about which radio technologies are enabled or active would not be processed due to the fact that such a SAR implementation would be specific for a single subsystem. To overcome such limitations, SAR power settings are communicated from the AC to a WLAN radio (for example a WLAN modem) via a direct serial communication interface based on wireless subsystem sensor inputs, platform sensor inputs, and current radio status of all connected radios (for example modems). Decisions for maximum power back-off table usage are made inside the wireless subsystem.

In accordance with at least one embodiment, a WWAN SAR radio transmit power level control feature is provided. The use of a personal computer (PC) platform embedded controller hard-coded to trigger SAR power back-offs by pulling limited number of general-purpose input/output pins (GPIOs) high or low would limit flexibility while occupying relatively scarce GPIOs. Information about which radio technologies are enabled or active would not be processed due to the fact that SAR implementation would be specific for a single subsystem. To overcome such limitations, SAR power settings are communicated from the AC to a WWAN radio (for example WWAN modem) via a M.2 interface based on wireless subsystem sensor inputs, platform sensor inputs, and current radio status of all connected radios (for example modems). Decisions to trigger maximum power back-off table usage are made inside the wireless subsystem.

In accordance with at least one embodiment, a WLAN antenna steering feature is provided. The AC implements antenna steering control, which can be done, for example, by switching antenna elements using an antenna switch, adjusting operation of an active antenna by transmitting an antenna control signal to an active element of the antenna, or by adjusting a conductive or dielectric element positioned in proximity to an antenna element. The antenna steering can be implemented with respect to a single antenna for a single radio, with respect to multiple antennas for multiple radios, or with respect to multiple antennas whose radiation patterns are combined to provide antenna steering for a single radio.

In accordance with at least one embodiment, a WWAN antenna swapping feature is provided. The antenna swapping feature can be controlled based on sensor inputs from a core (host) portion of the IHS. The antenna swapping feature can be implemented using an additional pin on a WWAN radio module (for example a GPIO pin assigned to implement antenna swapping and connected to an antenna switch to which a plurality of antennas as connected). Antenna swapping can be controlled by the AC, which can collect sensor information related to the wireless subsystem. Switch hardware can be directly controlled by the AC in order to conserve the number of pins used on the WWAN radio module.

In accordance with at least one embodiment, a SKU detection feature is provided. As an example, if antenna SKU detection were not provided, SAR back-offs for WWAN and WLAN could be sub-optimal, as the worst-case SKU values would be used, yielding unnecessarily low radio transmit power levels. To overcome such limitations, antenna SKU detection can be implemented and can trigger dedicated SAR power tables for WLAN (for example WiFi) radio operation based on each individual antenna SKU detected. Accordingly, WLAN radio performance will not be limited to sub-optimization.

In accordance with at least one embodiment, centralized wireless decisions are made at the AC. In absence of such centralization, a core (host) processor platform would make some decisions but would remain unaware of active antenna control implemented within the wireless subsystem, so coordination between the different control elements would be lacking and cross-vendor co-existence decisions and optimizations would not occur. To overcome such limitations, the antenna controller is configured to manage all radios and to receive information from all sensor inputs used in the decision making. Thus, the antenna controller has the information and the control capability to make centralized wireless decisions. Both radios can be optimized and controlled at the same time in a vendor-independent manner.

In accordance with at least one embodiment, a method includes receiving, from a platform sensor, platform sensor information as to an information handling system (IHS) physical configuration usage mode; receiving, from a proximity sensor (P-sensor), proximity sensing information as to a part of a body of a user to an antenna; obtaining, at an antenna controller (AC), a radio transmit power level value corresponding to the platform sensor information and to the proximity sensing information; sending, at the AC, the radio transmit power level value to a radio via a serial interface; adjusting, at the radio, a radio transmit power level to an adjusted radio transmit power level based on the radio transmit power level value; and reconfiguring, by the AC, the antenna in response to the platform sensor information and the proximity sensing information. In accordance with at least one embodiment, the reconfiguring, by the AC, the antenna in response to the platform sensor information and the proximity sensing information is selected from a group consisting of switching the antenna with a second antenna and steering a radiation pattern of the antenna. In accordance with at least one embodiment, the obtaining, at the AC, the radio transmit power level value corresponding to the platform sensor information and to the proximity sensing information includes obtaining, at the AC, a power table comprising a plurality of radio transmit power level values including the radio transmit power level value; and wherein the sending, at the AC, the radio transmit power level value to the radio includes sending, at the AC, the power table to the radio. In accordance with at least one embodiment, the obtaining, at the AC, the radio transmit power level value corresponding to the platform sensor information and to the proximity sensing information includes calculating, at the AC, the radio transmit power level value based on the platform sensor information and the proximity sensing information. In accordance with at least one embodiment, the obtaining, at the AC, the radio transmit power level value corresponding to the platform sensor information and to the proximity sensing information includes loading, at the AC, the radio transmit power level value corresponding to the platform sensor information and the proximity sensing information from a stored power table. In accordance with at least one embodiment, the loading, at the AC, the radio transmit power level value corresponding to the platform sensor information and the proximity sensing information from a stored power table includes loading, at the AC, the stored power table. In accordance with at least one embodiment, the method further includes adjusting the radio to operate at a failsafe radio transmit power level upon cessation of detection of a heartbeat signal between the AC and the radio over the serial interface.

In accordance with at least one embodiment, an information handling system (IHS) comprises a platform sensor; a proximity sensor (P-sensor); an antenna controller (AC) configured to receive, from the platform sensor, platform sensor information as to an information handling system (IHS) physical configuration usage mode, to receive, from the P-sensor, proximity sensing information as to a part of a body of a user to an antenna; to obtain a radio transmit power level value corresponding to the platform sensor information and to the proximity sensing information, to send the radio transmit power level value to a radio via a serial interface, and to reconfigure the antenna in response to the platform sensor information and the proximity sensing information; and a radio configured to adjust a radio transmit power level to an adjusted radio transmit power level based on the radio transmit power level value. In accordance with at least one embodiment, the AC is configured to reconfigure the antenna in response to the platform sensor information and the proximity sensing information by performing a reconfiguration selected from a group consisting of switching the antenna with a second antenna and steering a radiation pattern of the antenna. In accordance with at least one embodiment, the AC is configured to obtain the radio transmit power level value corresponding to the platform sensor information and to the proximity sensing information by obtaining, at the AC, a power table comprising a plurality of radio transmit power level values including the radio transmit power level value to send the radio transmit power level value to the radio by sending, at the AC, the power table to the radio. In accordance with at least one embodiment, the AC is configured to obtain the radio transmit power level value corresponding to the platform sensor information and to the proximity sensing information by calculating, at the AC, the radio transmit power level value based on the platform sensor information and the proximity sensing information. In accordance with at least one embodiment, the AC is configured to obtain the radio transmit power level value corresponding to the platform sensor information and to the proximity sensing information by loading, at the AC, the radio transmit power level value corresponding to the platform sensor information and the proximity sensing information from a stored power table. In accordance with at least one embodiment, the AC is configured to load the radio transmit power level value corresponding to the platform sensor information and the proximity sensing information from a stored power table by loading, at the AC, the stored power table. In accordance with at least one embodiment, the radio is further configured to operate at a failsafe radio transmit power level upon cessation of detection of a heartbeat signal between the AC and the radio over the serial interface.

In accordance with at least one embodiment, a method comprises receiving, from a platform sensor comprising a hinge sensor, platform sensor information as to an information handling system (IHS) physical configuration usage mode; receiving, from a proximity sensor (P-sensor), proximity sensing information as to a part of a body of a user to an antenna; obtaining, at an antenna controller (AC), a radio transmit power level value corresponding to the platform sensor information and to the proximity sensing information; sending, at the AC, the radio transmit power level value to a radio via a serial interface; adjusting, at the radio, a radio transmit power level to an adjusted radio transmit power level based on the radio transmit power level value; and reconfiguring, by the AC, the antenna in response to the platform sensor information and the proximity sensing information. In accordance with at least one embodiment, the reconfiguring, by the AC, the antenna in response to the platform sensor information and the proximity sensing information is selected from a group consisting of switching the antenna with a second antenna and steering a radiation pattern of the antenna. In accordance with at least one embodiment, the obtaining, at the AC, the radio transmit power level value corresponding to the platform sensor information and to the proximity sensing information comprises obtaining, at the AC, a power table comprising a plurality of radio transmit power level values including the radio transmit power level value; and wherein the sending, at the AC, the radio transmit power level value to the radio comprises sending, at the AC, the power table to the radio. In accordance with at least one embodiment, the obtaining, at the AC, the radio transmit power level value corresponding to the platform sensor information and to the proximity sensing information comprises calculating, at the AC, the radio transmit power level value based on the platform sensor information and the proximity sensing information. In accordance with at least one embodiment, the obtaining, at the AC, the radio transmit power level value corresponding to the platform sensor information and to the proximity sensing information comprises loading, at the AC, the radio transmit power level value corresponding to the platform sensor information and the proximity sensing information from a stored power table. In accordance with at least one embodiment, the loading, at the AC, the radio transmit power level value corresponding to the platform sensor information and the proximity sensing information from a stored power table comprises loading, at the AC, the stored power table.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM- CIA) card, or other such expansion card), or a system (such as a motherboard, a system-on-a-chip (SoC), or a stand-alone device).

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
  receiving, from a platform sensor, platform sensor information as to an information handling system physical configuration usage mode;
  receiving, from a proximity sensor (P-sensor), sensing information as to proximity of a part of a body of a user to an antenna, wherein the sensing information indicates whether the part of the body of the user is sensed near a first proximity sensing conductor or near a second proximity sensing conductor;
  obtaining, at an antenna controller (AC), a radio transmit power level value corresponding to the platform sensor information and to the proximity sensing information;
  sending, at the AC, the radio transmit power level value to a radio via a serial interface;
  adjusting a radio transmit power level to an adjusted radio transmit power level based on the radio transmit power level value; and
  reconfiguring, by the AC, the antenna in response to the platform sensor information and the proximity sensing information.

2. The method of claim 1, wherein the reconfiguring the antenna in response to the platform sensor information and the proximity sensing information is selected from a group consisting of switching the antenna with a second antenna and steering a radiation pattern of the antenna.

3. The method of claim 1, wherein the obtaining the radio transmit power level value corresponding to the platform sensor information and to the proximity sensing information comprises:
  obtaining a power table comprising a plurality of radio transmit power level values including the radio transmit power level value; and wherein the sending the radio transmit power level value to the radio comprises sending the power table to the radio.

4. The method of claim 1, wherein the obtaining the radio transmit power level value corresponding to the platform sensor information and to the proximity sensing information comprises:
  calculating the radio transmit power level value based on the platform sensor information and the proximity sensing information.

5. The method of claim 1, wherein the obtaining the radio transmit power level value corresponding to the platform sensor information and to the proximity sensing information comprises:
  loading the radio transmit power level value corresponding to the platform sensor information and the proximity sensing information from a stored power table.

6. The method of claim 5, wherein the loading the radio transmit power level value corresponding to the platform sensor information and the proximity sensing information from a stored power table comprises:
  loading the stored power table.

7. The method of claim 1, further comprising:
  adjusting the radio to operate at a failsafe radio transmit power level upon cessation of detection of a heartbeat signal between the AC and the radio over the serial interface.

8. An information handling system (IHS) comprising:
  a platform sensor;
  a proximity sensor (P-sensor);
  an antenna controller (AC) configured to receive, from the platform sensor, platform sensor information as to an IHS physical configuration usage mode, to receive, from the P-sensor, proximity sensing information as to a part of a body of a user to an antenna, wherein the sensing information indicates whether the part of the body of the user is sensed near a first proximity sensing conductor or near a second proximity sensing conductor; to obtain a radio transmit power level value corresponding to the platform sensor information and to the proximity sensing information, to send the radio transmit power level value to a radio via a serial interface, and to reconfigure the antenna in response to the platform sensor information and the proximity sensing information; and a radio configured to adjust a radio transmit power level to an adjusted radio transmit power level based on the radio transmit power level value.

9. The IHS of claim 8, wherein the AC is configured to reconfigure the antenna in response to the platform sensor information and the proximity sensing information by performing a reconfiguration selected from a group consisting of switching the antenna with a second antenna and steering a radiation pattern of the antenna.

10. The IHS of claim 8, wherein the AC is configured to obtain the radio transmit power level value corresponding to the platform sensor information and to the proximity sensing information by obtaining, at the AC, a power table comprising a plurality of radio transmit power level values including the radio transmit power level value to send the radio transmit power level value to the radio by sending, at the AC, the power table to the radio.

11. The IHS of claim 8, wherein the AC is configured to obtain the radio transmit power level value corresponding to the platform sensor information and to the proximity sensing information by calculating, at the AC, the radio transmit power level value based on the platform sensor information and the proximity sensing information.

12. The IHS of claim 8, wherein the AC is configured to obtain the radio transmit power level value corresponding to the platform sensor information and to the proximity sensing information by loading, at the AC, the radio transmit power level value corresponding to the platform sensor information and the proximity sensing information from a stored power table.

13. The IHS of claim 12, wherein the AC is configured to load the radio transmit power level value corresponding to the platform sensor information and the proximity sensing information from a stored power table by loading, at the AC, the stored power table.

14. The IHS of claim 8, wherein the radio is further configured to operate at a failsafe radio transmit power level upon cessation of detection of a heartbeat signal between the AC and the radio over the serial interface.

15. A method comprising:
   receiving, from a platform sensor comprising a hinge sensor, platform sensor information as to an information handling system physical configuration usage mode;
   receiving, from a proximity sensor (P-sensor), proximity sensing information as to a part of a body of a user to an antenna, wherein the sensing information indicates whether the part of the body of the user is sensed near a first proximity sensing conductor or near a second proximity sensing conductor;
   obtaining, at an antenna controller (AC), a radio transmit power level value corresponding to the platform sensor information and to the proximity sensing information;
   sending the radio transmit power level value to a radio via a serial interface;
   adjusting a radio transmit power level to an adjusted radio transmit power level based on the radio transmit power level value; and
   reconfiguring the antenna in response to the platform sensor information and the proximity sensing information.

16. The method of claim 15, wherein the reconfiguring the antenna in response to the platform sensor information and the proximity sensing information is selected from a group consisting of switching the antenna with a second antenna and steering a radiation pattern of the antenna.

17. The method of claim 15, wherein the obtaining the radio transmit power level value corresponding to the platform sensor information and to the proximity sensing information comprises:
   obtaining a power table comprising a plurality of radio transmit power level values including the radio transmit power level value; and wherein the sending the radio transmit power level value to the radio comprises sending the power table to the radio.

18. The method of claim 15, wherein the obtaining the radio transmit power level value corresponding to the platform sensor information and to the proximity sensing information comprises:
   calculating the radio transmit power level value based on the platform sensor information and the proximity sensing information.

19. The method of claim 15, wherein the obtaining the radio transmit power level value corresponding to the platform sensor information and to the proximity sensing information comprises:
   loading the radio transmit power level value corresponding to the platform sensor information and the proximity sensing information from a stored power table.

20. The method of claim 19, wherein the loading the radio transmit power level value corresponding to the platform sensor information and the proximity sensing information from a stored power table comprises loading the stored power table.

* * * * *